United States Patent Office 3,080,043
Patented Mar. 5, 1963

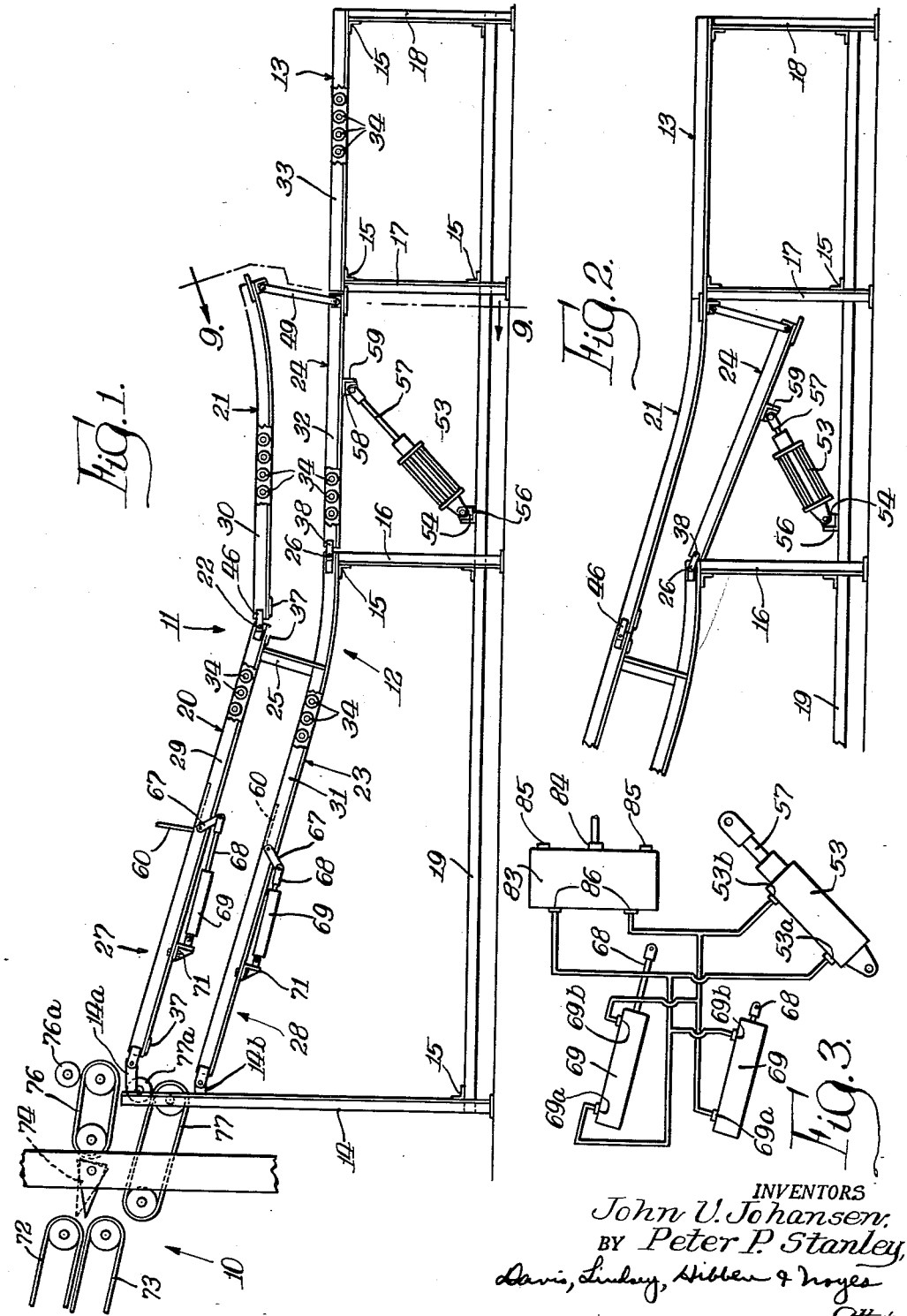

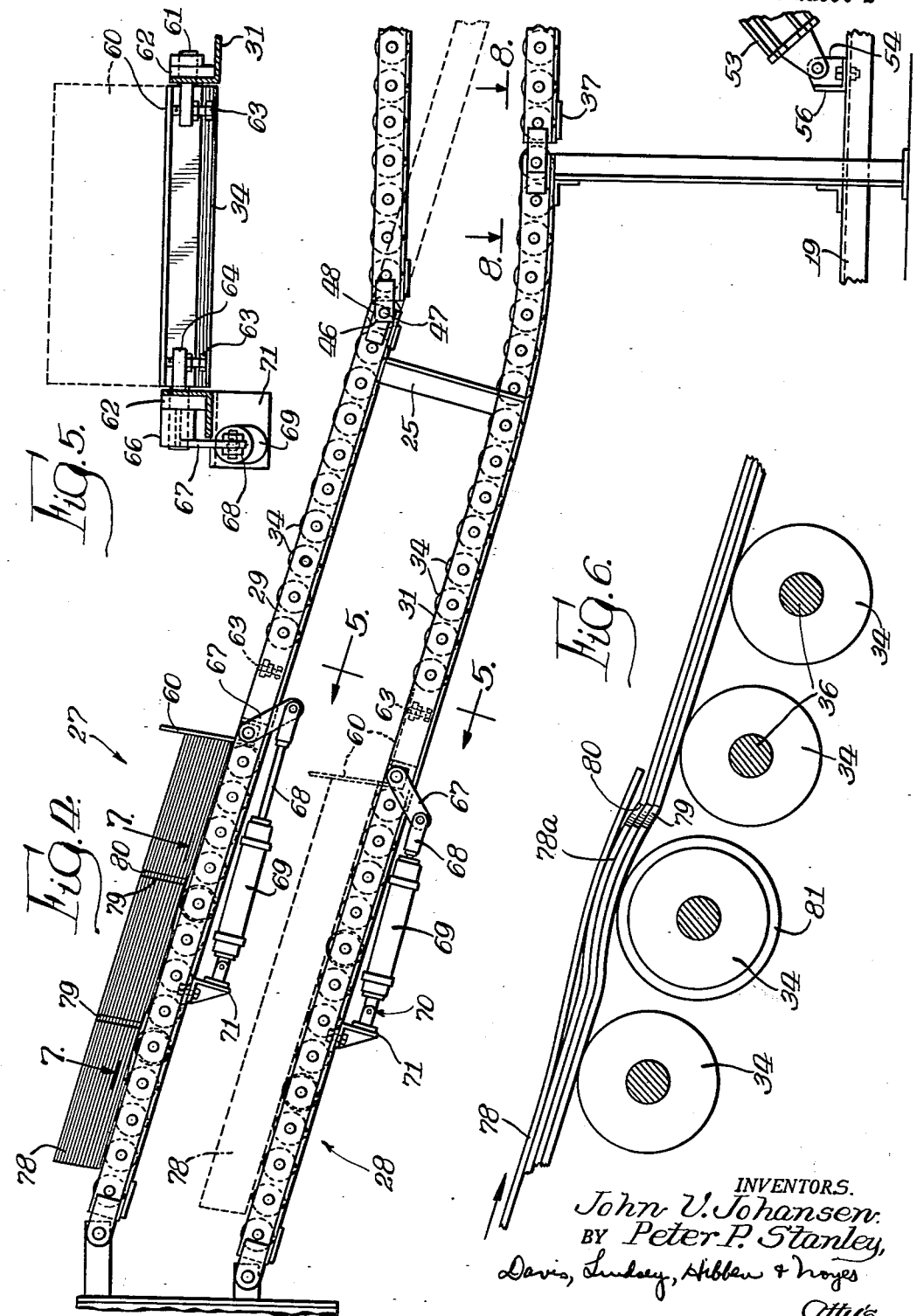

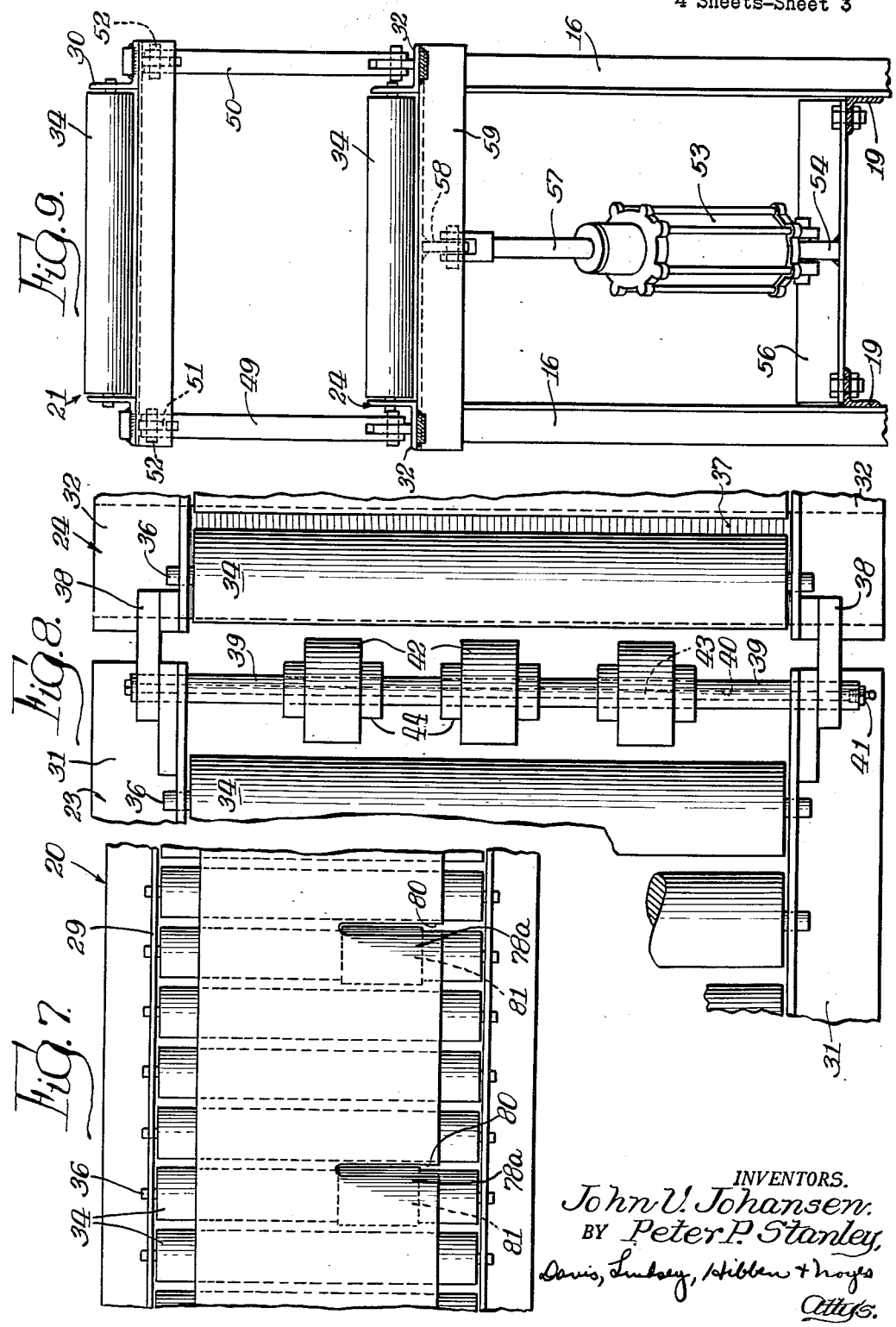

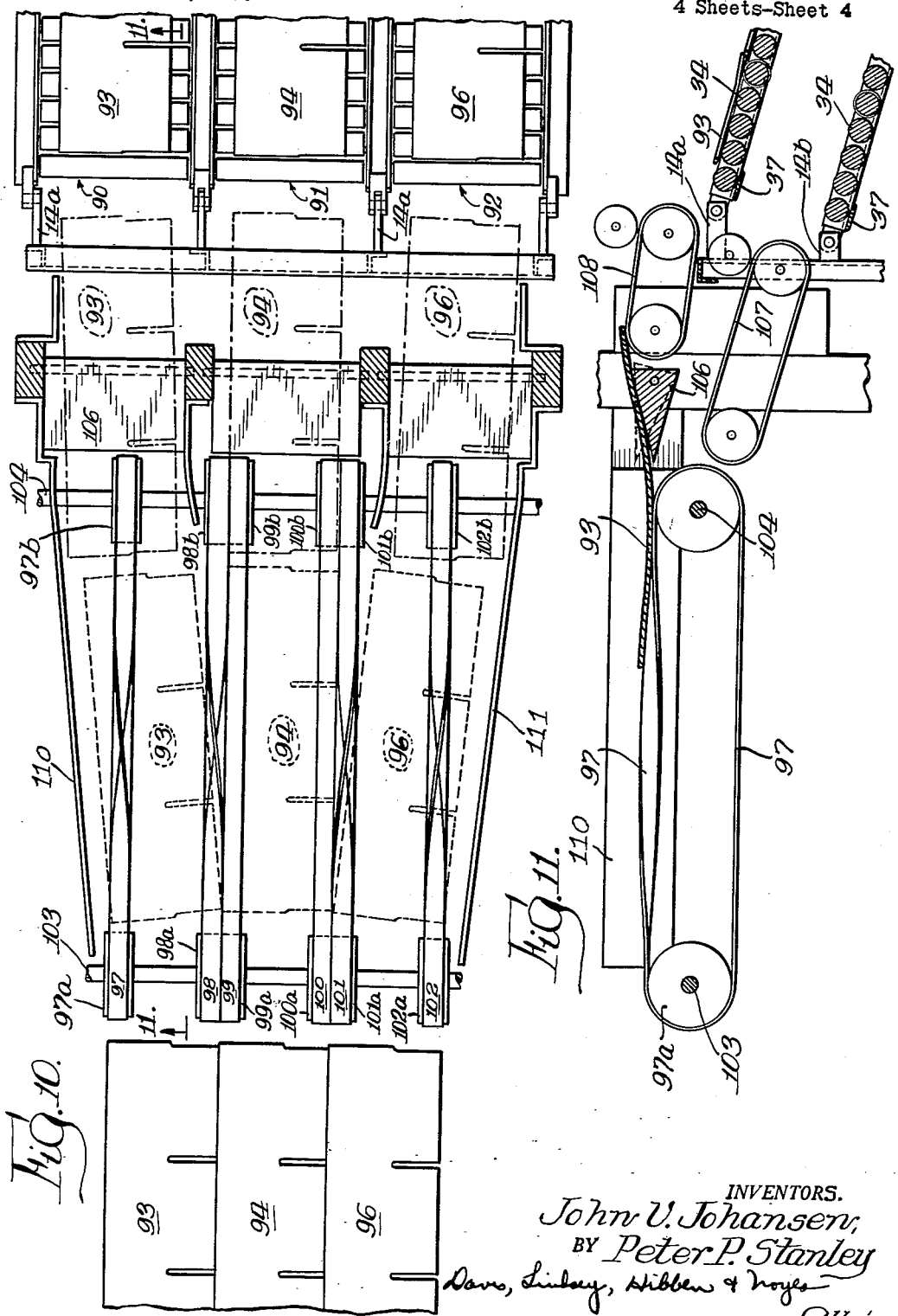

1

3,080,043
APPARATUS FOR CONVEYING AND
STACKING ARTICLES
John V. Johansen, Winnetka, and Peter P. Stanley, River
Forest, Ill., assignors to Reichel & Drews, Inc., Chicago,
Ill., a corporation of Illinois
Filed Dec. 5, 1958, Ser. No. 778,351
11 Claims. (Cl. 198—35)

This invention relates to an apparatus for conveying and stacking articles, and more particularly to an apparatus for stacking and conveying thin, somewhat flexible articles or sheets, such as shingles or the like.

One of the objects of the invention is to provide a conveyor apparatus including a stacking station in which articles may be stacked in alignment and from which a stack may be delivered to the outlet end of said conveyor in a neatly formed and aligned stack ready for packaging.

Another object of the invention is to provide a conveyor apparatus including an inclined stacking station in which articles may be stacked with their leading edges defining an inclined plane which will be adjusted to a vertical plane as the stack is passed onto a horizontal conveyor section.

A further object of the invention is to provide a conveyor apparatus including a stacking station for articles having an interrupted surface, there being means at said stacking station to raise the article rearwardly of the interruption in said surface to permit a succeeding article to slide thereover without catching on said interruption.

Still another object of the invention is to provide a conveyor apparatus having two fixed entry sections, a fixed outlet conveyor section, two intermediate movable conveyor sections adapted to alternately connect said fixed entry sections with said outlet conveyor section, and a stacking station for articles in each of said fixed entry conveyor sections.

Another further object is to provide an improved article delivery or feed-in means for delivering a plurality of flat articles to a plurality of conveyor mechanisms.

Other objects and advantages of the present invention will become apparent as this description progresses, reference being had to the accompanying drawings, in which:

FIGURE 1 is a side elevational view of a shingle stacking apparatus comprising a preferred embodiment of the present invention;

FIG. 2 is an enlarged side elevational view of the front portion of the apparatus shown in FIG. 1 and illustrating the intermediate section of the lower conveyor in lowered inactive position and with the intermediate section of the upper conveyor also in lowered but active conveying position;

FIG. 3 is a flow diagram showing the manner in which the pneumatic operating cylinders are connected to a source of fluid pressure;

FIG. 4 is an enlarged side elevational view showing the two stacking stations and conveyors in somewhat more detail;

FIG. 5 is a vertical sectional view taken on the line 5—5 in FIG. 4, looking rearwardly in the direction of the arrows;

FIG. 6 is a fragmentary side elevational view of a portion of one of the stacking stations illustrating three shingles in stacked position and a fourth shingle sliding into position on top thereof, the shingles being raised upwardly at one point by a means to be described hereinafter;

FIG. 7 is a sectional view taken on the line 7—7 in

2

FIG. 4, looking downwardly in the direction of the arrows;

FIG. 8 is a top plan view of a portion of the lower conveyor or chute looking downwardly from the position shown by the lines 8—8 in FIG. 4;

FIG. 9 is an irregular vertical sectional view taken on the line 9—9 in FIG. 1 and looking rearwardly in the direction of the arrows;

FIG. 10 is a top plan view of an improved form of shingle feeding means for delivering a plurality of shingles in side by side relation into a plurality of conveyor and stacking machines arranged side by side; and FIG. 11 is a vertical sectional view taken on the line 11—11 in FIG. 10, looking in the direction of the arrows.

Referring more particularly to FIG. 1 of the drawings, there is shown in its overall aspects a shingle stacking apparatus comprising, a preferred embodiment of the present invention. In general, the apparatus comprises a feed-in mechanism comprising belts and rolls indicated generally by the numeral 10 at the entry or rearward end of the apparatus and two chutes or roller conveyors 11 and 12, one disposed above the other and each of which are adapted to be connected to a common horizontal roller conveyor section 13 at the front end of the apparatus. The conveyors 11 and 12 and the conveyor section 13 are supported by a frame comprising long vertical angle bars 14 at the rear of the apparatus on each side thereof and shorter vertical angle bars 16, 17 and 18 at the center and forward end of the apparatus on each side thereof. The vertical bars 14, 16, 17 and 18 are joined adjacent their respective feet to horizontal tie bars 19 on each side of the machine and are also secured to cross braces 15 thus forming a rigid supporting structure.

The upper conveyor 11 comprises a fixed inclined section 20 and a movable intermediate section 21 pivoted at 22 to the lower end of the inclined section 20 and adapted to be raised and lowered out of and into connecting relationship, respectively, with the front fixed conveyor section 13. Similarly, the lower conveyor 12 comprises a fixed inclined section 23 and a movable intermediate section 24 pivoted at 26 to the lower end of the inclined section 23 and also adapted to be raised and lowered simultaneously with the upper movable section 21 into and out of connecting relationship with the horizontal fixed front conveyor section 13. The upper or rearward portions of the inclined conveyor sections 20 and 23 constitute stacking stations 27 and 28, respectively, wherein a plurality of shingles are fed into the apparatus and alternately stacked first in one station and then in the other as will be described in detail hereinafter. The upper and lower conveyor sections 20 and 23 are secured in spaced relation to plates 14a and 14b on the upstanding end irons 14 and at their forward portions they are secured to and maintained in spaced relation by angle bars 25.

Each of the conveyor sections 20, 21, 23, 24 and 13 are formed with angle bars 29, 30, 31, 32 and 33 on each side thereof in spaced parallel relationship, and a plurality of closely spaced rollers 34 are provided from end to end of the conveyor sections and have stub shafts 36 journaled in the upstanding portions of the angle bars 29 to 33, inclusive, for free rotative movement. The side bars 29 to 33, inclusive, are secured to the cross braces 15 and to additional flat braces 37, thus being rigidly supported to maintain the proper spacing for the rollers 34. As shown more particularly in FIG. 8 of the drawings, the movable intermediate section 24 of the lower conveyor 12 is pivoted to the fixed section 23 by means of rearwardly extending plates 38 secured to the side bars 32 and having the ends of a cross shaft 39 projecting therethrough. The cross shaft 39 is carried by the side bars 31 of the lower conveyor section 23. The cross shaft 39 is provided with a central bore 40 into which grease may be forced through a fitting 41 to provide lubrication for three spaced brass rollers 42 through radial holes 43 in the shaft 39. The rollers 42 are mounted on the shaft 39 for free rotative movement and they are retained in position between pairs of collars 44 fixed to the shaft.

In like manner, as shown in FIG. 4, the movable intermediate section 21 of the upper conveyor 11 is provided with rearwardly extending pivot plates 46 which are similarly pivoted on the projecting ends of a shaft 47 having brass rollers 48 rotatably mounted thereon in a manner similar to the arrangement shown in FIG. 8.

The forward ends of the movable intermediate conveyor sections 21 and 24 are connected to one another for unitary raising and lowering movement by a pair of upstanding arms 49 and 50 which are pivoted at their upper and lower ends to sections 21 and 24, respectively. The upper and lower ends of the arms 49 and 50 are bifurcated to receive supporting tongues 51 projecting downwardly and upwardly from the side bars 30 and 32, respectively, and pivot pins 52 extend through the bifurcations and tongues thus providing a pivotal relationship between the respective parts. An air cylinder 53 is pivoted at its lower end to a plate 54 formed on a cross bar 56 secured to the lower side bars 19 and has a reciprocable piston rod 57 pivoted at its upper end to a plate 58 formed on a cross bar 59 which is secured on the under sides of the side bars 32 of the lower intermediate conveyor section 24. The admission of air under pressure into the top and bottom of the air cylinder 53 will actuate the piston rod 57 to its retracted or projected positions, respectively.

In the projected position of the rod 57 the intermediate section 21 of the upper conveyor is in raised position and the intermediate section 24 of the lower conveyor is also in raised position but in alignment with the conveyor sections 12 and 13 so as to form a continuous roller conveyor. When the piston arm 57 is retracted, the intermediate conveyor sections 21 and 24 are in their lowered positions, as shown in FIG. 2, with the intermediate section 21 of the upper conveyor 11 in alignment with conveyor sections 20 and 13 thus forming another continuous roller conveyor. As will be explained more fully hereinafter, the air cylinder 53 and piston rod 57 are actuated to their respective positions in timed sequence with the timed alternate release of the stacked shingles from the respective stacking stations 27 and 28. One or the other of the intermediate conveyor sections 21 and 24 are in their active conveying positions when the shingle stacks are released for the respective stations disposed at the entry ends of the conveyors.

The stacking stations 27 and 28 of the upper and lower conveyors 11 and 12 are of substantially identical construction with similar parts and consequently the description of one stacking station will suffice for the other. As shown more particularly in FIGS. 1 and 4 to 7, inclusive, of the drawings, each stacking station includes a pivoted stop plate 60. In FIGS. 1 and 4, the stop plate 60 of the upper stacking station 27 is shown in upright or active position whereas the plate 60 of the lower station 28 is shown in broken lines in both its upright and its flat or inactive positions. The lower stop plate 60, as shown in FIG. 5 in its down or flat position, is provided with stub shafts 61 at its ends which are journaled in the side bars 31 and in reenforcing bearing blocks 62 secured to the side bars 31. The downward position of the plate 60 is limited and determined by spaced screws 63 which are vertically adjustable and which engage the undersurface of the plate 60 and serve as stops. The stop screws 63 are supported by plates 64 secured to the inner sides of side bars 31 and projecting inwardly therefrom.

One of the stub shafts 61 is somewhat longer than the other and is received within and secured to a hub 66 formed on the upper end of a short rock lever 67. The rock lever 67 is pivoted to the forward end of the piston arm 68 of an air cylinder 69 which is pivoted at its rearward end as at 70 to a cross bar 71 secured to the under surface of the side bar 31. It is to be noted that rollers 34 are omitted from the upper and lower conveyor sections 20 and 23 immediately in front of the plates 60 in order to permit the plates 60 to be pivoted from operable upright position to inoperable down position wherein the upper surfaces of the plates 60 are slightly below the upper peripheries of the rollers. The plates 60 are moved from upright to down position by actuation of the air cylinders 69 which cause a rocking action of the rock levers 67 and the shafts 61. When the piston arm 68 is in projected position the plate 60 is in the upright, shingle stopping position and when it is in its retracted position the plate 60 is in its downward or shingle stack releasing position. The cross bar 71, as shown in FIG. 4, is adjustable longitudinally of the side bars 31 by a bolt and a slot connection so that the length of the throw of the lever may be adjusted as desired to determine the angular position of the plate 60.

The means for feeding individual shingles to the shingle stacking apparatus comprising the present invention is shown in FIG. 1 and includes a plurality of superimposed conveyor belts 72 and 73 between which individual shingles pass somewhat downwardly into engagement with a pivoted triangular shaped feed table or deflector 74 which serves to guide the shingles either upwardly to the upper feed belt 76 or to the lower feed belt 77. Rollers 76a and 77a are disposed above the belts 76 and 77, respectively, and serve to facilitate the delivery of the shingles into the respective stacking stations. The feed-in apparatus which is shown somewhat diagrammatically in FIG. 1 is adapted to be automatically operated by a counting mechanism (not shown) such as an electronically operable counting mechanism including a photoelectric cell which serves to actuate the deflector 74 to its upper or lower positions and also serves to cause actuation through well known types of controls (not shown) the air cylinders 53 and 69 so as to actuate the intermediate conveyor sections 21 and 24 and the stop plates 60 in the necessary timed sequence. When shingles 78 are to be fed to the upper stacking station 27, the deflector 74 is automatically moved to its solid line position of FIG. 1 whereby the shingles 78 pass out from between the conveyor belts 72 and 73, over the deflector 74 and on to the upper conveyor belt 76 which carries the shingle forwardly to the stacking station 27.

As the first shingle 78 leaves the conveyor belt 76, it drops down onto the rollers 34 which are aligned with the belt 76 and by gravity it passes on down over the rollers 34 into the upper stacking station 27 until its front edge engages the stop plate 60 which remains in upright position during the stacking operation. The feeding of shingles 78 to the upper stacking station 27 will be continued with the following shingles sliding down onto the upper surface of the preceding stacked shingles until the front edges also engage the stop plate 60.

The shingles 78 are elongated and may be provided with two spaced transverse slots 79 cut inwardly from one of the side edges of the shingle so as to constitute interruptions in the surfaces thereof and when in stacked relation these slots will be in alignment as shown in FIG. 4. Because the slots 79 are of substantial width, there is a tendency for the leading edges of succeeding shingles 78 to engage and stop against the forward edge 80 of the slot of the preceding top shingle of the stack as the succeeding shingle slides thereover. Such sticking of a shingle in the slot of a preceding shingle would necessarily disrupt the stacking operation and would prevent the formation of a neat, even stack.

One of the features of the present invention is the provision of means to prevent such sticking of shingles in the slots 79 and such means comprises, for each of the stacking stations 27 and 28, as shown in FIGS. 6 and 7, a collar or sleeve 81 secured on the rollers 34 which are immediately back of the slot 79 of the first shingle when it is in engagement against the stop plate 60. The collars 81 are of greater diameter than the rollers 34 and, consequently, they project upwardly to a greater extent as they engage the under surfaces of the shingle portions 78a just rearwardly of the slots. This results, as shown in FIG. 6, with the shingle portions 78a back of the slots 79 being raised so that as a succeeding shingle slides onto the stack its leading edge on one side will be raised and caused to clear the slot entirely and reengage the lower shingle beyond the slot 79.

The plates 60 in their upstanding positions are disposed at right angles to the planes of their respective conveyors but as shown in the drawings they are inclined slightly rearwardly away from the vertical so that the stack of shingles at its front edge will be inclined rearwardly from bottom to the top thereof. When the plate 60 of the upper stacking station is released, for example, the stack of shingles will slide downwardly by gravity over the rollers 34 of the inclined conveyor sections 20 and 21 and pass onto the rollers 34 of the horizontal end section 13 of the conveyor. As the stack of shingles 78 passes from the inclined sections to the horizontal section of the conveyor there is a forward sliding movement or adjustment of the top shingles relative to the lower ones, and, consequently, the stack must be arranged with a rearward inclination at its forward edge so as to compensate for the forward adjustment. The rearward inclination of the plates 60 creates the rearward inclination of the stack in the stacking station but when the stack is finally received on the horizontal conveyor section 13 and is ready to be removed therefrom, it will be found that the stack is substantially vertical at its front and rear as well as its side edges with the shingles in substantial alignment ready for wrapping. It is apparent that in the event the shingles are not stacked in vertical alignment as delivered to the end of the conveyor section 13, it would be virtually impossible to wrap them into a neat package capable of withstanding shipping and handling.

The adjustability of the angle of inclination of the stop plate 60 provides compensation for the angle at which the inclined and horizontal portions of the conveyors are disposed with respect to each other.

In FIG. 3 of the drawings, there is shown a pneumatic flow diagram and the valve control for the air cylinders 53 and 69. A control valve 83 which may be electronically controlled in response to operation of the photoelectric cell of the counting mechanism (not shown) is shown diagrammatically and comprises an air inlet port 84 adapted to be connected to a source of air pressure, two exhaust ports 85 and two ports 86 connected to the ports of the air cylinders 69 and 53. The air cylinders 69 are each provided with ports 69a and 69b below and above the piston in the cylinder and the air cylinder 53 is provided with ports 53a and 53b also below and above its piston. Thus piston rod movement of the cylinders is effected by admitting air above or below the piston as determined by position of the valve 83. It is to be further understood that although the plate 60 may be disposed in inclined position as above described, substantially the same result may be accomplished by providing a rearwardly curved plate so that the leading edge of the stack of shingles may assume a curved contour.

The above described apparatus is capable of rapid operation and produces shingles in stacks at the forward end of the horizontal roller conveyor section 13 from which they may be removed as rapidly as received either manually or by a wrapping machine. Assuming that the stacking apparatus is in the position shown in FIG. 1, shingles will be fed one at a time over the deflector 74 onto the conveyor 76 and down into the upper stacking station 27 with the leading edges of the shingles in abutting relation against the rearwardly inclined stop plate 60, the leading edge of the stack assuming an inclination rearwardly from the bottom to the top. As each shingle is fed into the station, the two collars 81 on rollers 34 cause the shingle portions immediately behind the shingle slots 79 to be raised so as to permit the later fed shingles to slide over the shingle slots 79 without catching on the slot edges 80.

When the requisite number of shingles have been counted by the counting mechanism, the electronic controls will actuate the air control valve 83 to direct air under pressure to the forward end of the upper air cylinder 69 to retract the piston rod 68 and lower the stop plate 60 to release the stack of shingles. At approximately the same time, air under pressure is admitted to the forward or upper end of the air cylinder 53 to retract the piston rod 57 and to lower the intermediate conveyor section 24 out of connection with the horizontal conveyor section 43 and place the upper intermediate conveyor section 21 into connection with the end section 13. Thus, as the stack of shingles is released when the stop plate 60 is flattened, the stack slides downwardly over the rollers 34 in the conveyor sections 20, 21 and 13 to the end of section 13.

Simultaneously, with actuation of the upper air cylinder 69 and the air cylinder 53, air is also admitted under pressure to the rearward end of the lower air cylinder 69 so as to cause the piston rod 68 to be projected to rock the rock shaft 67 forwardly and raise the lower stop plate 60 to upstanding but inclined position where it is ready to receive shingles fed into the lower stacking station 28.

Also substantially simultaneously as the air cylinders 69 and 53 are actuated to accomplish the results as above described, the feed deflector 74 is also pivoted to the broken line position of FIG. 1 whereby shingles fed out from between the belts 72 and 73 are guided downwardly onto the lower conveyor belt 77. The shingles then pass downwardly into the lower stacking station 28 until their forward edges engage the rearwardly inclined stop plate 60. When the stack in the lower station 28 reaches the desired number of shingles, the electronic controls again actuate the valve 83 in the opposite direction so as to admit air under pressure to the ends of the cylinders 69 and 53 opposite to those referred to above. This causes the piston rods 68 and 57 to move in the opposite direction, releasing the lower stop plate 60, raising the lower intermediate section 24 into connection with the horizontal conveyor section 13, and raising the stop plate 60 of the upper stacking station. This operation is repeated automatically with the shingles being successfully stacked in first one stacking station and then in the other and then passing down onto the horizontal conveyor section 13 without requiring any manual intervention of an operator.

In the event the conveyor and shingle stacking apparatus described above and shown in FIGS. 1 to 9, inclusive, of the drawings, is enlarged from a single lane apparatus to a two lane or a three lane apparatus in order to increase production from a shingle cutting machine, the single lane apparatus may be duplicated and the conveyors secured together in a unitary structure. In FIGS. 10 and 11 there is shown a three lane conveyor system comprising roller conveyors and stacking stations 90, 91 and 92 which may be of similar construction to that shown in FIGS. 1 to 9, inclusive, of the drawings. A novel form of mechanism for feeding a plurality of shingles to the plurality of conveyors and stacking stations and also comprising an important feature of the present invention is positioned at the entries to the three conveyors 90, 91 and 92 and serves to separate or spread the shingles from their closely adjacent positions when they leave the shingle cutting machine to spaced-apart positions whereby the shingles may enter the conveyors on a line parallel with the conveyors for parallel movement therethrough.

The shingles 93, 94 and 96 are shown in FIG. 10 in side by side relationship as they are leaving the shingle cutting machine (not shown) and as they are about to pass to the right onto a plurality of pairs of spaced endless conveyor belts 97 and 98, 99 and 100 and 101 and 102. The belts 97 and 98 extend around pairs of spaced pulleys 97a and 97b and 98a and 98b, respectively, which are fixed on shafts 103 and 104, one of which may be the driven shaft. Similarly belts 99 and 100 extend around pairs of spaced pulleys 99a and 99b and 100a and 100b and belts 101 and 102 extend around and are driven by spaced pulleys 101a and 101b and 102a and 102b. The pairs of belts are so spaced that they support and convey the shingles with the side edges of the shingles in substantial alignment with the side edges of the belts as the shingles enter onto the belts. Forwardly of each set of belts there is a pivoted guide plate or deflector 106, shown in FIG. 11, which is similar to and serves the same purpose as the deflector 14 of FIG. 1, only the deflector 106 which is related to the belts 97 and 98 being shown in FIG. 10.

The deflectors 106 are adapted to be pivoted upwardly or downwardly by automatic controls (not shown) so as to direct the shingles either downwardly or upwardly onto conveyor belts 107 and 108 depending upon which stacking stations of the conveyors 90, 91 and 92 are to receive the shingles for stacking. Preferably, the controls may be so arranged that the deflector for the center shingle 94 is in its upward position to deflect the shingle downwardly into the lower stacking station of the center conveyor 91, whereas the deflectors 106 for the two outer pairs of belts 97 and 98 and 101 and 102 are in their downward positions so as to deflect the side shingles 93 and 96 upwardly into the upper stacking stations of the conveyors 90 and 92.

The belts 97 and 98 are each twisted on their upper lengths or webs from right to left so that the side edge of the belt presents itself as the shingle supporting surface and extends from right to left at the central portion of the web as viewed from the entry end of the belts. When the pulleys are rotated, the twisted webs of the belts remain on the top, and, consequently, as the shingle 93 enters onto the belts 97 and 98 it at first moves in a straight line direction until its front portion engages the twist. When the shingle passes onto the twisted portions of the belts 97 and 98, it rides up onto the side edges of the twist which move from right to left and carry the shingle diagonally to the left so that it becomes supported to a greater extent on the belt 97. A guide plate 110 is diagonally mounted along the side of the belt 97 and is adapted to limit the off-setting movement of the shingle and to assist in retaining the shingle on the single belt. The twist in the belt causes shingle 93 to move to the left a distance slightly less than the width of the belt and, consequently, the amount of lateral movement of the shingle may be varied by varying the width of the belt and twisting the same as above described. After the shingle 93 has been moved laterally, it engages the deflector 106, as shown in FIG. 11, and passes on to the conveyor belt 108 where the deflector is in its downward position.

In like manner, the belts 101 and 102 are twisted at their upper central web from left to right, as viewed from the entry end of the belts, so that when the shingle 96 passes onto the belts 101 and 102 it moves diagonally to the right a lateral distance slightly less than the width of the belts. A diagonal guide plate 111 similar to plate 110 is positioned along the outer side of belt 102. The center pair of belts 99 and 100 are not twisted as are the side pairs and hence the center shingle 94 passes onto the belts 99 and 100 and continues in a straight line into engagement with the center deflector 106. Thus, by the spaced pairs of pulleys with pairs of oppositely twisted belts thereover on the outer sides and a pair of untwisted belts in the center, closely adjacent shingles 93, 94 and 96 are caused to be spread into spaced relation in axial alignment with their respective conveyors 90, 91 and 92.

Although there have been shown in the drawings and described above a preferred embodiment of the conveyor and article stacking apparatus and a feed-in conveyor mechanism for spreading a plurality of shingle lines into alignment with a plurality of said conveyors, it is to be understood that modifications may be made in the details of structure and mode of operation without departing from the spirit and scope of the appended claims.

We claim:
1. An elongated conveyor apparatus comprising a plurality of fixed conveyor sections in spaced apart relation at the entry end of said apparatus, means at each of said fixed conveyor sections for assembling a plurality of articles in close arrangement and comprising stop means for holding said articles until a requisite number thereof have been assembled, a fixed conveyor section at the outlet end of said conveyor apparatus adapted to be alternately connected to said entry conveyor sections, a plurality of movable conveyor sections, one for each of said entry conveyor sections, adapted to be moved alternately into and out of connecting relation between said entry conveyor sections and said outlet conveyor section, means for releasing said stop means to permit movement of said assembled articles along said conveyor and means for alternately moving said movable conveyor sections into and out of connecting relation between said entry conveyor sections and said outlet conveyor section.

2. An elongated conveyor apparatus comprising a plurality of fixed conveyor sections in spaced apart relation at the entry end of said apparatus, means at each of said fixed conveyor sections for assembling a plurality of articles in close arrangement and comprising stop means for holding said articles until a requisite number thereof have been assembled, a fixed conveyor section at the outlet end of said conveyor apparatus adapted to be alternately connected to said entry conveyor sections, a plurality of movable conveyor sections, one for each of said entry conveyor sections, adapted to be moved alternately into and out of connecting relation between said entry conveyor sections and said outlet conveyor section, means for releasing said stop means to permit movement of said assembled articles along said conveyor and means for alternately moving said movable conveyor sections into and out of connecting relation between said entry conveyor sections and said outlet conveyor section, said releasing means and said moving means being operable automatically and simultaneously in timed sequence when the assembly of a requisite number of articles on one of said entry conveyor sections has been completed.

3. An elongated conveyor apparatus comprising an entry conveyor section inclined downwardly from the entry end thereof, a substantially horizontal conveyor section, and a stacking station on said entry conveyor section adapted to receive and stack a plurality of articles one on top of the other and having a stop means at the lower end of said station movable from operable position to inoperable position, said stop means being adapted to engage the leading edges of said articles and to define the plane angle of the front of said stack and being disposed when in operable position at an angle inclined toward the entry end of said station relative to the plane of said stacking station whereby the plane formed by the leading edges of said stack of articles is also inclined in the same manner and said angular relation between said inclined and horizontal conveyor sections serving to cause sliding movement of the stacked articles relative to each other during passage from the inclined to the horizontal section whereby said plane formed by the leading edges of the articles is moved to a substantial vertical angle relative to the plane of the horizontal conveyor section.

4. An elongated conveyor apparatus comprising an entry conveyor section inclined downwardly from the entry end thereof, a substantially horizontal conveyor section, and a stacking station on said entry conveyor section adapted to receive and stack a plurality of articles one on top of the other and having a stop means at the lower end of said station movable from operable position to inoperable position, and means for moving said stop means from operable position to inoperable position to permit said stack of articles to pass downwardly over the inclined conveyor section onto the horizontal conveyor section, said stop means being adapted to engage the leading edges of said articles and to define the plane angle of the front of said stack and being disposed when in operable position at an angle inclined toward the entry end of said station relative to the plane of said stacking station whereby the plane formed by the leading edges of said stack of articles is also inclined in the same manner and said angular relation between said inclined and horizontal conveyor sections serving to cause sliding movement of the stacked articles relative to each other during passage from the inclined to the horizontal section whereby said plane formed by the leading edges of the articles is moved to a substantial vertical angle relative to the plane of the horizontal conveyor section.

5. An elongated conveyor apparatus comprising an entry conveyor section inclined downwardly from the entry end thereof, a substantially horizontal conveyor section, and a stacking station on said entry conveyor section adapted to receive and stack a plurality of articles one on top of the other and having a stop means at the lower end of said station movable from operable position to inoperable position, each of said conveyor sections and said stacking station being provided with a plurality of anti-friction means to permit passage of a stack of articles therealong, said stop means being adapted to engage the leading edges of said articles and to define the plane angle of the front of said stack and being disposed when in operable position at an angle inclined toward the entry end of said station relative to the plane of said stacking station whereby the plane formed by the leading edges of said stack of articles is also inclined in the same manner and said angular relation between said inclined and horizontal conveyor sections serving to cause sliding movement of the stacked articles relative to each other during passage from the inclined to the horizontal section whereby said plane formed by the leading edges of the articles is moved to a substantial vertical angle relative to the plane of the horizontal conveyor section.

6. A stacking apparatus for stacking a plurality of articles which are formed with an interruption in the surface thereof, said apparatus comprising a supporting surface on which said articles are stacked and a raised portion on said supporting surface adapted to engage and raise the article on one side of and adjacent to said interruption whereby a succeeding article may pass over the interruption into stacked relation without caticing on said interruption.

7. A shingle stacking apparatus for stacking a plurality of shingles having a slot cut inwardly from a side edge thereof, said apparatus comprising a supporting surface on which said shingles are stacked and a raised portion on said supporting surface adapted to engage and raise the shingle on one side of said slot whereby a succeeding shingle may pass over the slot of a lower shingle into stacked relation without catching on the side edge of said slot.

8. A shingle stacking apparatus for stacking a plurality of shingles having a slot cut inwardly from a side edge thereof, said apparatus comprising a supporting surface on which said shingles are stacked, means for feeding said shingles onto said supporting surface with a sliding movement, and a raised portion on said supporting surface adapted to engage and raise the shingle on one side of said slot whereby a succeeding shingle may pass over the slot of a lower shingle into stacked relation without catching on the side edge of said slot.

9. A shingle stacking apparatus for stacking a plurality of shingles having a slot cut inwardly from a side edge thereof, said apparatus comprising a plurality of rollers providing a supporting surface upon which said shingles are stacked, one of said rollers being provided with a portion of greater diameter adapted to engage and raise a shingle on one side of said slot whereby a succeeding shingle may pass over the slot of a lower shingle into stacked relation without catching on the side edge of said slot.

10. A shingle stacking apparatus for stacking a plurality of shingles having a slot cut inwardly from a side edge thereof, said apparatus comprising a plurality of rollers providing a supporting surface upon which said shingles are stacked, one of said rollers being provided with a portion of greater diameter adapted to engage and raise a shingle on one side of said slot whereby a succeeding shingle may pass over the slot of a lower shingle into stacked relation without catching on the side edge of said slot, and aligning means for arranging said shingles in alignment with respect to each other and with respect to said roller portion of greater diameter.

11. A shingle stacking apparatus for stacking a plurality of shingles having a slot cut inwardly from a side edge thereof, said apparatus comprising a plurality of rollers providing a supporting surface upon which said shingles are stacked, and a collar secured on one of said rollers adapted to engage and raise the shingle on one side of said slot whereby a succeeding shingle may pass over the slot of a lower shingle into stacked relation without catching on the side edge of said slot.

References Cited in the file of this patent

UNITED STATES PATENTS

| | | |
|---|---|---|
| 1,809,456 | Streeter | June 9, 1931 |
| 2,274,075 | Bombard | Feb. 24, 1942 |
| 2,484,196 | Turrall | Oct. 11, 1949 |
| 2,606,483 | Forbes | Aug. 12, 1952 |
| 2,745,538 | Lamb | May 15, 1956 |
| 2,752,050 | Nordquist | June 26, 1956 |
| 2,804,192 | Armstrong | Aug. 27, 1957 |
| 2,805,757 | Rapley | Sept. 10, 1957 |
| 2,821,123 | Fuller | Jan. 28, 1958 |
| 2,856,060 | Malnati | Oct. 14, 1958 |
| 2,886,929 | Villemont | May 19, 1959 |